(12) United States Patent
Pfeiffer

(10) Patent No.: US 10,737,655 B2
(45) Date of Patent: Aug. 11, 2020

(54) HOUSING FOR AN AIRBAG MODULE AND METHOD FOR MANUFACTURING SUCH HOUSING

(71) Applicant: TAKATA AG, Aschaffenburg (DE)

(72) Inventor: Johannes Pfeiffer, Berlin (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 75 days.

(21) Appl. No.: 15/739,214

(22) PCT Filed: Jun. 30, 2016

(86) PCT No.: PCT/EP2016/065338
§ 371 (c)(1),
(2) Date: Dec. 22, 2017

(87) PCT Pub. No.: WO2017/001577
PCT Pub. Date: Jan. 5, 2017

(65) Prior Publication Data
US 2018/0186327 A1    Jul. 5, 2018

(30) Foreign Application Priority Data
Jul. 2, 2015   (DE) .................. 10 2015 212 416

(51) Int. Cl.
*B60R 21/217*     (2011.01)
*B60R 21/20*      (2011.01)
(Continued)

(52) U.S. Cl.
CPC ........ *B60R 21/2176* (2013.01); *B29C 43/203* (2013.01); *B32B 5/024* (2013.01);
(Continued)

(58) Field of Classification Search
CPC . B60R 21/2176; B60R 21/20; B32B 2605/00; B32B 27/12; B32B 5/024;
(Continued)

(56) References Cited

U.S. PATENT DOCUMENTS 3,717,528 A * 2/1973 Peerman ............... D06M 17/04
156/179
4,623,592 A * 11/1986 Daude ................. B32B 17/1077
156/106
(Continued)

FOREIGN PATENT DOCUMENTS

| DE | 195 35 564 A1 | 3/1997 |
|---|---|---|
| DE | 197 05 829 C1 | 5/1998 |
| EP | 0 861 760 B1 | 3/2003 |
| WO | WO 2015/024544 A1 | 2/2015 |

OTHER PUBLICATIONS

International Search Report dated Sep. 26, 2016 issued in PCT/EP2016/065338.

*Primary Examiner* — Frank B Vanaman
(74) *Attorney, Agent, or Firm* — Gordon Rees Scully Mansukhani, LLP

(57) ABSTRACT

A housing for an airbag module for accommodating a folded gas bag. The housing including a base portion and at least one lateral portion projecting from the base portion. At least one of the portions comprises at least two layers of a flexible material, which are arranged one above the other and are cohesively connected with each other.

11 Claims, 4 Drawing Sheets

(51) Int. Cl.
  *B29C 43/20* (2006.01)
  *B32B 5/02* (2006.01)
  *B32B 27/12* (2006.01)
  *B32B 27/40* (2006.01)
  *B29K 75/00* (2006.01)
  *B29K 105/00* (2006.01)
  *B29L 31/30* (2006.01)

(52) U.S. Cl.
  CPC .............. *B32B 27/12* (2013.01); *B32B 27/40* (2013.01); *B60R 21/20* (2013.01); *B29K 2075/00* (2013.01); *B29K 2105/256* (2013.01); *B29L 2031/3038* (2013.01); *B32B 2605/00* (2013.01)

(58) Field of Classification Search
  CPC ... B32B 27/40; B29C 43/203; B29K 2075/00; B29K 2105/256; B29L 2031/3038
  See application file for complete search history.

(56) References Cited

U.S. PATENT DOCUMENTS

| | | | | |
|---|---|---|---|---|
| 5,333,568 | A | * | 8/1994 | Meldner ................. B29C 70/44 114/102.31 |
| 5,393,090 | A | * | 2/1995 | Shepherd ............ B60R 21/2171 280/728.1 |
| 5,806,879 | A | * | 9/1998 | Hamada .............. B60R 21/2171 280/728.2 |
| 6,115,998 | A | | 9/2000 | Reh et al. |
| 7,407,180 | B2 | * | 8/2008 | Yokoyama ........... B60R 21/205 280/728.2 |
| 10,112,568 | B2 | * | 10/2018 | Webber ................ B60R 21/205 |
| 2005/0013961 | A1 | * | 1/2005 | Fossey, Jr. ................ B32B 5/26 428/57 |
| 2005/0225059 | A1 | * | 10/2005 | Lewis ................. B60R 21/2176 280/728.2 |
| 2007/0007752 | A1 | | 1/2007 | Rose et al. |
| 2007/0138769 | A1 | | 6/2007 | Miwa et al. |

* cited by examiner

HOUSING FOR AN AIRBAG MODULE AND METHOD FOR MANUFACTURING SUCH HOUSING

CROSS-REFERENCE TO A RELATED APPLICATION

This application is a National Phase Patent Application of International Patent Application Number PCT/EP2016/065338, filed on Jun. 30, 2016, which claims priority of German Patent Application Number 10 2015 212 416.9, filed on Jul. 2, 2015.

BACKGROUND

The invention relates to a housing for an airbag module and to a method for manufacturing such housing.

A housing for an airbag module serves to accommodate a folded gas bag and a gas generator which in the case of activation fills the gas bag with a gas. The gas bag filled with gas serves to protect a person present inside or outside a motor vehicle in an accident situation. During inflation of the gas bag, the gas bag exits from the housing in order to be deployed for the protection of said person. The housing also can serve as holder for the gas generator.

From the prior art plastic and metal housings are known as housings for airbag modules. These materials provide the housing with a high stability and strength, but are of correspondingly thick-walled configuration for stability reasons, so that the weight of the housing is correspondingly high. In the automotive industry great efforts are made to keep the weight of the individual vehicle components as low as possible in order to for example lower the fuel consumption of the vehicle. Therefore, in the field of airbag modules attempts also are made to reduce the weight of the airbag modules.

In this respect US 2007/0007753 A1 for example proposes to at least partly fabricate the housing of an airbag module from a flexible material, such as a fabric. To provide the housing with stability, a rim of a rigid material to which the flexible material is attached is provided in an edge region. The necessary processes for connecting the flexible material with the rigid material are expensive and incur high costs.

SUMMARY

It is an object underlying the invention to provide a housing for an airbag module, which has a low weight and can be manufactured at low cost by fulfilling all functional requirements.

This object is solved by a housing with features as described herein and a method for manufacturing such housing with features as described herein.

Accordingly, the housing comprises a base portion and at least one lateral portion projecting from the base portion. In the case of a rectangular base portion four lateral portions can be provided, which each project from an edge of the base portion and for example each are aligned orthogonally to the base portion. In addition a ceiling portion can be provided, which faces the base portion and is spaced from the base portion by the at least one lateral portion.

The housing according to the invention is characterized in that at least one of the portions (base portion, lateral portion, ceiling portion) comprises at least two layers of a flexible material, which are arranged one above the other (vertically to their two-dimensional extension) and are cohesively connected with each other (along at least a part of their two-dimensional extension). Due to the double- or multi-layer configuration of at least one of the portions, an increase in stability of the flexible material and thus of the entire housing is achieved. For the cohesive connection a corresponding connecting material can be used, which can further increase the stability of the flexible material and thus of the housing.

According to one embodiment, the flexible material can comprise a fabric. Useful fabrics for example include polyamide fabrics, in particular nylon fabrics, or polyester fabrics. In a preferred embodiment, the fabric which also serves as gas bag fabric is used as material for at least one of the portions.

For connecting the at least two layers a connecting material can be provided between the at least two layers, which is suitable for the cohesive connection of the at least two layers.

Preferably, the connecting material has a two-dimensional extension, each over the entire surface of the at least two layers between the at least two layers. Thus, a particularly high strength of the connection can be achieved.

The connecting material can be provided as coating on one of the at least two layers. Alternatively, the connecting material can also be provided as coating on each of the at least two layers. In another variant the connecting material can be provided as separate layer which before connecting the at least two layers can be arranged between the at least two layers. The connecting material can be configured as foil.

According to one embodiment, the connecting material is a material which is solid at temperatures that usually can be achieved in a motor vehicle (up to +85° C.). Beside the material layers forming the portions, the connecting material thereby also contributes to the strength of the housing. Preferably, the melting temperature lies above 120° C.

For producing the connection between the at least two layers, the connecting material can be activatable under the influence of a particular pressure and/or a particular temperature. By the term activatable it is meant that the connecting material can change such that it acquires the ability to connect the at least two material layers. For example, the connecting material can be molten by application of pressure and/or temperature. In the molten condition, the connecting material can deform and adapt to the surface structure of the at least two layers. After termination of the application of pressure and/or temperature, the deformed connecting material solidifies and then cohesively connects the at least two layers.

In order not to damage the layers themselves when connecting the at least two layers, the connecting material can have a (distinctly) lower melting point (preferred melting temperature below 190° C.) than the flexible material which forms the at least two layers. Preferably, a thermoplastic material, in particular thermoplastic polyurethane, can serve as connecting material.

In a preferred embodiment, each portion of the housing comprises at least two layers. The strength and dimensional stability of the housing thereby is increased, wherein the entire housing however is relatively lightweight (as compared with metal or plastic housings). In another preferred embodiment, all portions of the housing exclusively are fabricated of the flexible material and the connecting material.

The housing according to the invention can be manufactured by a method as described herein.

This method provides that initially at least two layers of a flexible material, which serve to form at least one of the portions, are arranged one above the other (vertically to their two-dimensional extension). After the at least two layers have properly been aligned relative to each other, the at least two layers are cohesively connected with each other (along at least a part of their two-dimensional extension).

To assist in the correct alignment of the at least two layers relative to each other a template can be used as orientation aid. To furthermore provide the housing with a defined form/shape, a shape-giving device can be used, with respect to which the at least two layers are arranged before being cohesively connected. Depending on the type of shape-giving device, the at least two layers can be arranged in, at or on the shape-giving device. When the shape-giving device comprises a box mold, the at least two layers, which will form at least one of the portions of the housing, can be arranged for example in the box mold. In addition, further layers which will form the remaining portions of the housing also can be arranged in the box mold. Moreover, a folded gas bag also can be arranged in the shape-giving device. Preferably, the gas bag is arranged in the box mold before connecting the at least two layers.

It can furthermore be provided that before the cohesive connection the at least two layers are releasably attached to the shape-giving device. In the case of an activation of the connecting material by means of pressurization, it can be prevented for example that during the pressurization the at least two layers can move relative to the shape-giving device and also relative to each other and hence impair the result.

Between the at least two layers the connecting material can be arranged in the form of a foil in order to subsequently cohesively connect the at least two layers with each other by means of the connecting material. For cohesively connecting the at least two layers, pressure and/or temperature can be applied to the connecting material.

BRIEF DESCRIPTION OF THE DRAWINGS

The invention will be explained in detail below with reference to the drawings.

DETAILED DESCRIPTION

Figure 1:
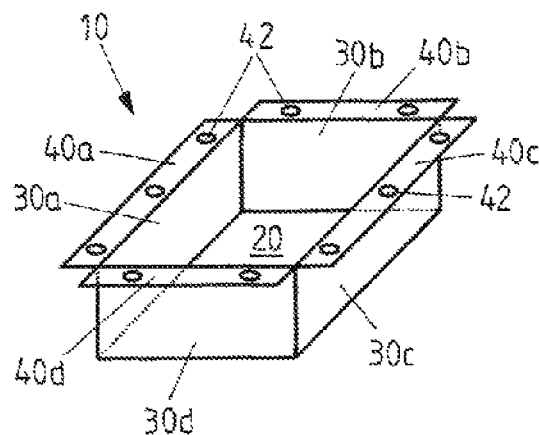
FIG. 1 shows a schematic representation of a housing with a base portion and four lateral portions projecting from the base portion, which each end in flange portions.

FIG. 1 shows a schematic representation of a housing 10 for an airbag module according to an embodiment of the invention. In the present case, the housing 10 substantially is designed as cuboid hollow body with an open side. The housing 10 has a base portion 20 and four lateral portions 30a, 30b, 30c, 30d projecting from the base portion 20 (substantially at right angles). In the embodiment of FIG. 1, the base portion 20 and the lateral portions 30a, 30b, 30c, 30d each are formed flat and rectangular. However, these portions 20, 30a, 30b, 30c, 30d can also be shaped differently, in particular include bulges and shapes other than the rectangular shape. The base portion 20 and the lateral portions 30a, 30b, 30c, 30d are connected with each other such that they form a unilaterally open box, as shown in FIG. 1.

At their end facing away from the base portion 20 four flange portions 40a, 40b, 40c, 40d adjoin the lateral portions 30a, 30b, 30c, 30d, which protrude to the outside from the lateral portions 30a, 30b, 30c, 30d substantially parallel to the base portion 20. Although in FIG. 1 the flange portions 40a, 40b, 40c, 40d are of rectangular shape, other suitable shapes also are conceivable in principle. The four flange portions 40a, 40b, 40c, 40d are provided with openings 42 which can serve the attachment of the housing 10 to a motor vehicle structure or the attachment of other components to the housing 10. For attachment to the motor vehicle structure or of other components, the openings 42 can be penetrated by fastening means.

In the exemplary embodiment of FIG. 1 the base portion 20, the lateral portions 30a, 30b, 30c, 30d and the flange portions 40a, 40b, 40c, 40d are fabricated from fabric blanks. However, to form the base portion 20, the lateral portions 30a, 30b, 30c, 30d and the flange portions 40a, 40b, 40c, 40d other flexible materials can be used as well. Furthermore, the individual portions 20, 30a, 30b, 30c, 30d, 40a, 40b, 40c, 40d can be fabricated of different materials.

Figure 2:
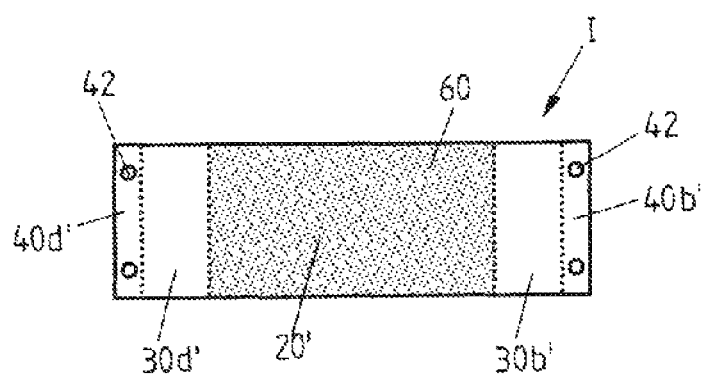
FIG. 2 shows a fabric blank for manufacturing the housing of FIG. 1, which forms the first layer of the base portion and the first layer of two lateral portions with their flange portions.
Figure 3:
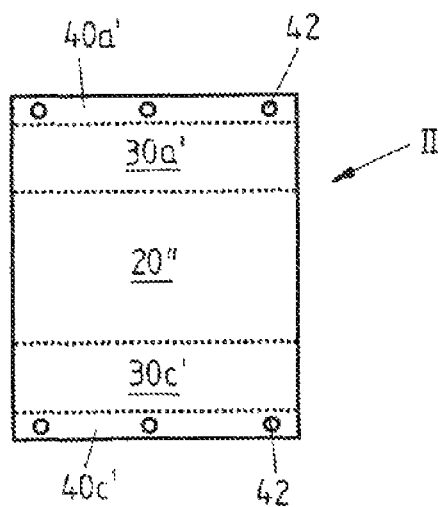
FIG. 3 shows a fabric blank for manufacturing the housing of FIG. 1, which forms the second layer of the base portion and the first layer of two more lateral portions with their flange portions.
Figure 4:
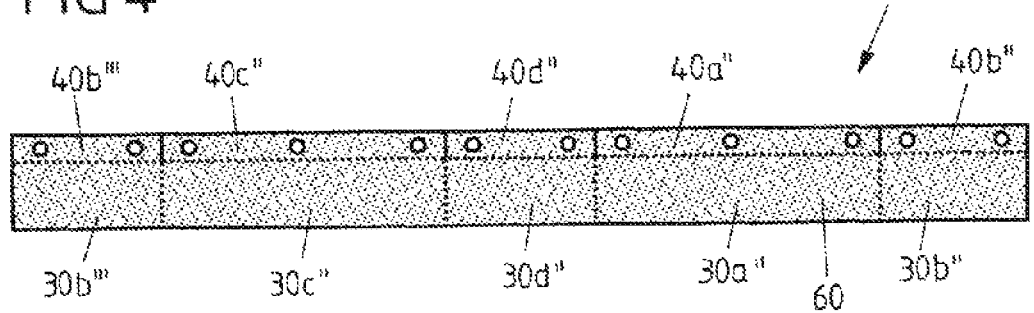
FIG. 4 shows a fabric blank for manufacturing the housing of FIG. 1, which forms the second layer of the four lateral portions with their flange portions.

FIGS. 2 to 4 show three fabric blanks I, II, III arranged in a planar manner, which serve to form the housing 10 of FIG. 1. The fabric blanks are divided into portions which in FIGS. 2 to 4 each are separated from each other by a dotted line. In the manufacture of the housing 10 edges (folded edges) are obtained, which extend along the dotted lines. For better clarity, the individual portions of the fabric blanks were provided with the reference numerals of the housing portions (base portion 20, lateral portions 30a, 30b, 30c, 30d and flange portions 40a, 40b, 40c, 40d) which they form in the housing 10 after joining. In addition, an index is used in order to indicate the respective position.

The fabric blank of FIG. 2 comprises a first base portion 20', two opposed first lateral portions 30b', 30d' and two corresponding first flange portions 40b', 40d'. The entire first base portion 20' is covered with a layer of a connecting material 60 (shown in gray).

The fabric blank of FIG. 3 comprises a second base portion 20'', two opposed first lateral portions 30a', 30c' and two corresponding first flange portions 40a', 40c'. For manufacturing the housing 10 the fabric blanks I and II are to be arranged relative to each other such that the second base portion 20'' comes to lie on the entire surface of the first base portion 20'.

The fabric blank of FIG. 4 comprises four second lateral portions 30a'', 30b'', 30c'', 30d'' and a third lateral portion 30b''' as well as the corresponding second flange portions 40a'', 40b'', 40c'', 40d'' and the corresponding third flange portion 40b'''. To all of said portions of FIG. 4 a layer of the connecting material 60 (shown in gray) is associated, wherein the connecting material 60 completely covers these portions. For manufacturing the housing 10 the fabric blank III is to be arranged with respect to the fabric blank I and the fabric blank II such that the second lateral portion 30a'' and the second flange portion 40a'' come to lie on the entire surface of the first lateral portion 30a' and of the first flange portion 40a', respectively, etc.

As a result, the base portion 20, the lateral portions 30a, 30b, 30c and the flange portions 40a, 40b, 40c of the housing 10 each comprise two layers when using the fabric blanks I, II and III, while the lateral portion 30b and the flange portion 40b of the housing 10 each comprise three layers.

The fabric blanks I, II, III all in all are provided with layers of connecting material 60 such that for each portion 20, 30a, 30b, 30c, 30d, 40a, 40b, 40c, 40d of the housing 10 at least one layer of connecting material 60 is provided, wherein the connecting material layer extends over the entire surface of each housing portion. In the fabric blanks I, II, III each connecting material layer each is associated to one of the fabric blank portions. In particular, the connecting material layers adhere to the respective fabric blank portion already before completion of the housing 10. The connecting material layer here can be a foil of a thermoplastic material or a coating of a thermoplastic material. The thermoplastic material can be a thermoplastic elastomer. For each portion a separately handleable foil can be provided.

In this connection it should be noted that the allocation of the connecting material 60 to the individual portions of the fabric blanks merely is to be understood by way of example. The connecting material 60 also can be associated to portions of the fabric blanks other than those indicated in FIGS. 2 to 4, in case it is ensured that in general for each portion 20, 30a, 30b, 30c, 30d, 40a, 40b, 40c, 40d of the housing 10 connecting material 60 is provided.

In addition, the fabric blanks I, II, III of FIGS. 2 to 4 only are to be understood by way of example. To form the first layer of flexible material for the entire housing 10 the fabric blanks I and II are required in this example, which together provide the portions 20', 30a', 30b', 30c', 30d', 40a', 40b', 40c', 40d'. The second layer is formed of the fabric blanks II and III which together provide the portions 20'', 30a'', 30b'', 30c'', 30d'', 40a'', 40b'', 40c'', 40d''. As an alternative to the example from FIGS. 2 to 4, the fabric blanks can be designed such that they each comprise other portions. A fabric blank for example can comprise a base portion 20' and two lateral portions 30a', 30b'. In this case, a single type of fabric blank can be used in duplicate for manufacturing the housing, wherein the two fabric blanks can be arranged not congruently, but one above the other rotated by 180° in order to form four lateral portions 30a', 30b', 30c', 30d' and two base portions 20', 20''. The housing formed of these fabric blanks then comprises a double-layer base portion 20 and four single-layer lateral portions 30a, 30b, 30c, 30d. In the examples described so far a layer of flexible material representing the entire housing 10 is formed of several fabric blanks. In these examples it is an advantage that by a suitable choice of the fabric blank shapes at least one folded edge (transition between two fabric blank portions within a fabric blank) can be provided on each edge of the housing (transition between two housing portions), and that in particular no edge of the housing exclusively is formed by two fabric blank portions of different fabric blanks meeting each other. The strength of the housing can further be increased thereby.

Alternatively, the fabric blanks also can be designed such that each fabric blank can each form all housing portions. For example, there can be provided only two fabric blanks which each include a base portion, four lateral portions and four flange portions. In this case, one of the fabric blanks would form the complete first layer and the other of the fabric blanks would form the complete second layer. The number of these fabric blanks can be chosen depending on the desired strength.

Figure 5:
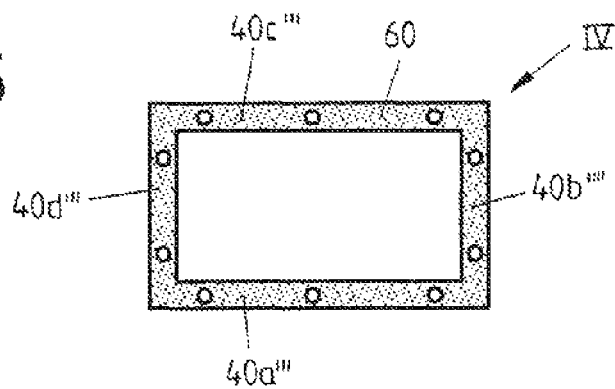
FIG. 5 shows a frame-like fabric blank for reinforcing the flange portions of the housing of FIG. 1.

FIG. 5 shows a frame-like fabric blank IV which can be used to reinforce the flange portions 40a, 40b, 40c, 40d of the housing 10. Correspondingly, the frame-like fabric blank IV comprises three third flange portions 40a''', 40c''', 40d''' and a fourth flange portion 40b''''. To these four flange portions 40a''', 40c''', 40d''', 40b'''' a layer of connecting material 60 (shown in gray) each is associated.

To further reinforce the flange portions 40a, 40b, 40c, 40d of the housing 10, the frame-like fabric blank IV can be used more than once to manufacture the housing 10.

Figure 6:
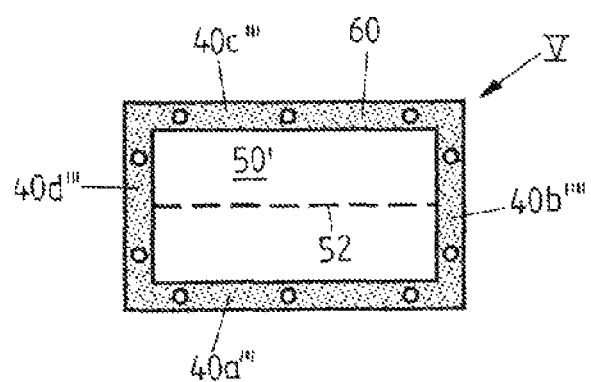
FIG. 6 shows a fabric blank for forming a ceiling portion for closing the housing of FIG. 1.

To close the unilaterally open housing 10 of FIG. 1, a ceiling portion 50 can be used as further portion. Advantageously, the housing 10 of FIG. 1 can be closed with the ceiling portion 50 after accommodating a folded gas bag in the housing 10. A corresponding fabric blank V for forming the ceiling portion 50 of the housing 10 is shown in FIG. 6. The fabric blank V comprises a ceiling portion 50' and flange portions 40a''', 40c''', 40d''', 40b'''' surrounding the same on all sides, which serve to connect the ceiling portion 50 with the unilaterally open housing 10 along its flange portions 40a, 40b, 40c, 40d and with the flange portions of the fabric blanks I, II and III (and of the fabric blank IV), respectively. For this purpose, the flange portions 40a''', 40c''', 40d''', 40b'''' of the fabric blank V each are provided with a connecting material layer 60 (shown in gray). In a central area of the ceiling portion 50' the fabric blank V is provided with a line-shaped predetermined breaking point 52 (e.g. in the form of spaced perforations or a weakening) along which the ceiling portion 50 can tear open due to the deploying gas bag. Beside the line shape, the predetermined breaking point 52 also can have other suitable shapes.

Figure 7:
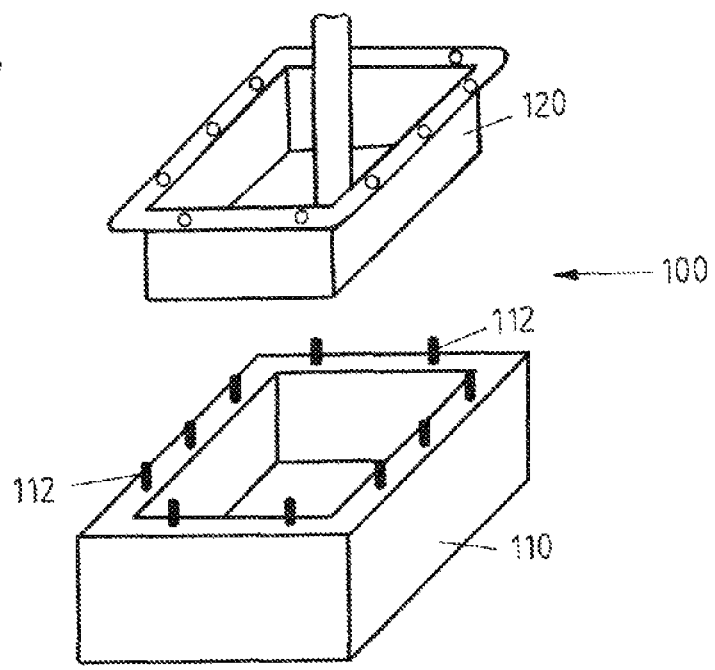
FIG. 7 shows a schematic representation of a shape-giving device for manufacturing the housing of FIG. 1.

FIG. 7 shows an embodiment of a shape-giving device 100 for manufacturing the housing 10 of FIG. 1. As lower part 110, the shape-giving device 100 comprises a unilaterally open box mold into which the fabric blanks I, II and III (and IV) can be inserted. A pressure stamp 120 is movable into the opening of the box mold 110 and movable out of the opening. The pressure stamp 120 has a shape substantially complementary to the box mold 110, so that the box mold 110 and the pressure stamp 120 can cooperate such that a pressure can be exerted on fabric blanks which are arranged between the lower part 110 and the pressure stamp 120 in order to connect the fabric blanks with each other. The lower part 110 comprises fixing pins 112 which in the edge region are arranged around the opening of the lower part 110 and serve the correct positioning and the fixation of the fabric blanks with respect to the lower part 110.

Figure 8:
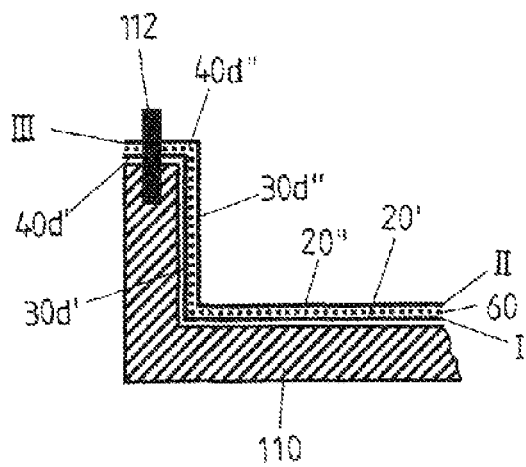
FIG. 8 shows a sectional view through a lower part of the shape-giving device of FIG. 7, in which the fabric blanks of FIGS. 2, 3 and 4 are properly arranged for manufacturing a housing according to a first embodiment of the method.
Figure 9:
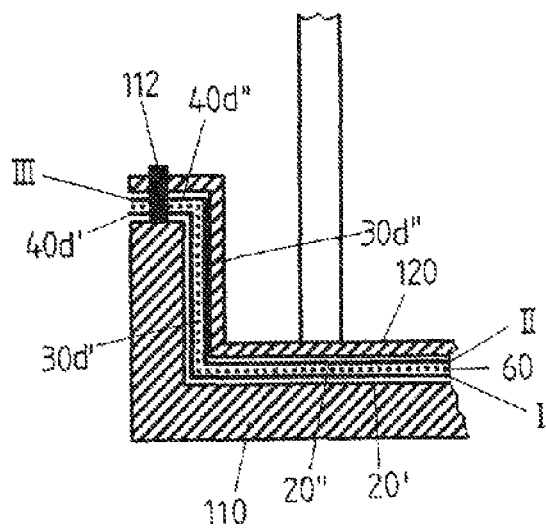
FIG. 9 shows a sectional view corresponding to FIG. 8, wherein the fabric blanks of FIGS. 2, 3 and 4 are pressurized by means of a pressure stamp as part of the shape-giving device.
Figure 10:
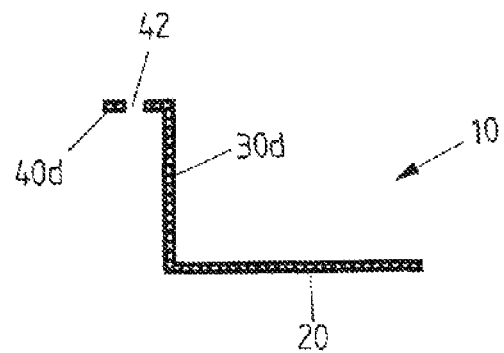
FIG. 10 shows a sectional view of the housing of FIG. 1 after removal from the shape-giving device of FIG. 9.

With reference to FIGS. 8 to 10 a first embodiment of a method for manufacturing the housing 10 is explained, in which the shape-giving device 100 of FIG. 7 is used.

For manufacturing the housing 10 the above-described fabric blanks I, II, III (FIGS. 2, 3, 4) initially are arranged in the lower part 110 of the shape-giving device 100 such that the fabric blank portions with corresponding designations overlap (FIG. 8). For example, the fabric blanks I and II are arranged relative to each other in the lower part 110 such that the base portion 20' of the fabric blank I and the base portion 20" of the fabric blank II overlap. The fabric blanks I and III are arranged relative to each other in the lower part 110 such that the lateral portions 30b' and 30d' of the fabric blank I overlap with the lateral portions 30b" and 30b''' or 30d" of the fabric blank III (the same applies for the flange portions). The fabric blanks II and III are arranged relative to each other in the lower part 110 such that the lateral portions 30a' and 30c' of the fabric blank II overlap with the lateral portions 30a" or 30c" of the fabric blank III (the same applies for the flange portions).

For the exact positioning of the fabric blanks I, II, III the openings 42 in the flange portions 40a', 40b', 40c', 40d', 40a", 40b", 40c", 40d", 40b''' on the one hand and the fixing pins 112 in the edge region of the lower part 110 on the other hand are used, wherein for the exact positioning of the fabric blanks I, II, III the fixing pins 112 pass through the openings 42 of the flange portions 40a', 40b', 40c', 40d', 40a", 40b", 40c", 40d", 40b''' (FIG. 8).

Subsequently, a defined pressure and a defined temperature is applied to the fabric blanks I, II, III arranged in the lower part 110 for a certain period (FIG. 9). For this purpose, the pressure stamp 120 is moved in direction of the lower part 110, so that the fabric blanks I, II, III are pressed in between the lower part 110 and the pressure stamp 120. The application of temperature to the fabric blanks I, II, III can be effected by heating the lower part 110 and/or the pressure stamp 120. Alternatively, it is possible to accommodate the shape-giving device 100 with the pressurized fabric blanks I, II, III in a heating cabinet for a certain period.

The temperature is chosen such that the connecting material 60 melts, but without changing, in particular melting or damaging the flexible material of the fabric blanks I, II, III. Subsequently, the shape-giving device 100 is cooled to below the melting point of the connecting material 60, so that the connecting material 60 solidifies and permanently connects the individual layers of the flexible material.

Subsequently, the pressure stamp 120 is removed from the lower part 110, so that the housing 10 can be taken out of the lower part 110. The housing 10 fabricated in this way (FIG. 10) is fabricated completely from one fabric, wherein individual layers of the fabric are held together by means of the connecting material 60. The housing 10 now is available for the further completion of the airbag module, for example for accommodating a folded gas bag (and for covering with a ceiling portion 50).

Figure 11:
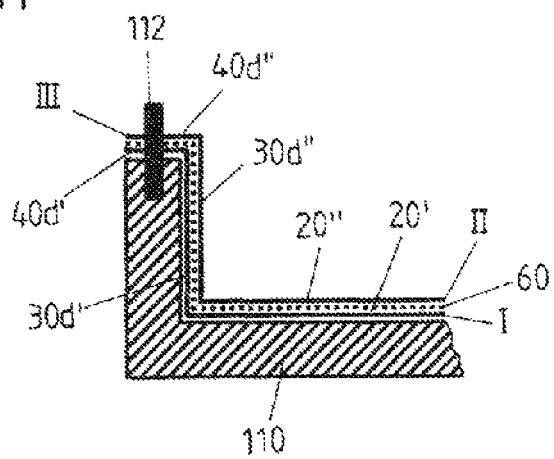
FIG. 11 shows a sectional view through the lower part of the shape-giving device of FIG. 7, in which the fabric blanks of FIGS. 2, 3 and 4 are properly arranged for manufacturing a housing according to a second embodiment of the method.
Figure 12:
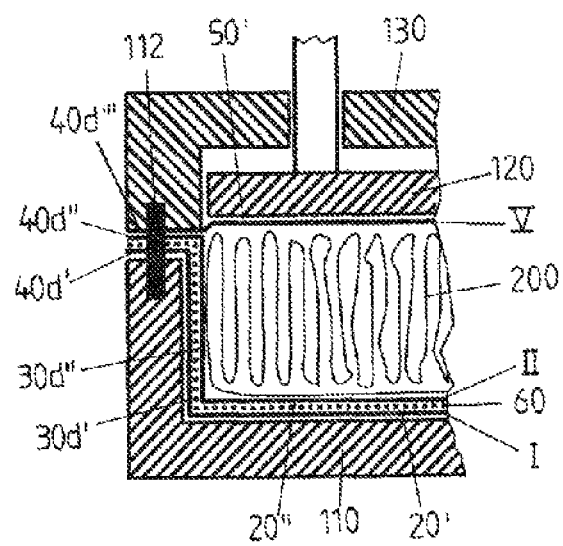
FIG. 12 shows a sectional view corresponding to FIG. 11, wherein in addition a folded gas bag is arranged in the lower part and the gas bag and the fabric blanks of FIGS. 2, 3 and 4 are covered with the fabric blank of FIG. 6, wherein the fabric blanks of FIGS. 2, 3 and 4 are pressurized by means of the pressure stamp and the fabric blank of FIG. 6 is pressurized with an upper part of the shape-giving device.
Figure 13:
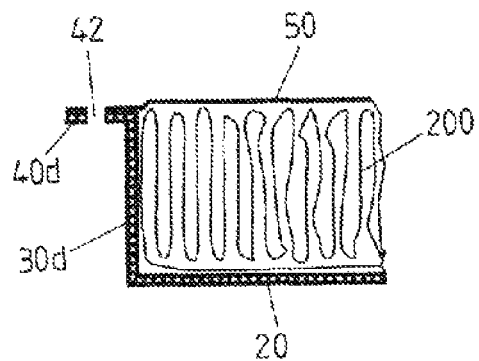
FIG. 13 shows a sectional view of the housing with the folded gas bag and the ceiling portion after removal from the shape-giving device of FIG. 12.

In connection with FIGS. 11 to 13 a second embodiment of a method for manufacturing the housing 10 is described. In contrast to the method of FIGS. 8 to 10 the method according to the second embodiment leads to a housing 10 which in addition to the housing 10 of FIGS. 1 and 10 comprises a ceiling portion 50 and is equipped with a folded gas bag 200.

For manufacturing the housing 10 the fabric blanks I, II, III (FIGS. 2, 3, 4) initially are arranged in the lower part 110 of the shape-giving device 100 (FIG. 11) like already in the first embodiment of the method. FIG. 11 (second embodiment of the manufacturing method) corresponds to FIG. 8 (first embodiment of the manufacturing method).

After this step, a folded gas bag 200 is arranged in the lower part 110 of the shape-giving device 100. For this purpose, the lower part 110 is arranged in a gas bag folding device below a folding table and the folded gas bag 200 is pressed in and compressed. A corresponding method is indicated in DE 195 35 564 A1, which in so far is included in the present application by reference. Alternatively, the lower part 110 lined with the fabric blanks I, II, III can be equipped with a separately handleable gas bag package (folded gas bag) 200.

Subsequently, the gas bag package 200 is covered by the fabric blank V of FIG. 6 which forms the ceiling portion 50, and an upper part 130 of the shape-giving device 100 is put onto the lower part 110. By means of non-illustrated fastening means lower and upper part 110, 130 are braced against each other and thus connected with each other. In the upper part 130 the pressure stamp 120 is shiftably arranged, by means of which pressure is exerted on the fabric blank V, the folded gas bag 200 and the fabric blanks I, II, III. The folded gas bag 200 is compressed further and a defined pressure is generated in the gas bag package 200. This condition is shown in FIG. 12. Accordingly, the fabric blanks I, II, III are not pressurized directly by the pressure stamp 120, but indirectly via the gas bag package 200.

The pressure stamp 120 used in the second embodiment of the method differs from the pressure stamp 120 from the first embodiment of the method in that it need not necessarily have a shape complementary to the lower part 110 of the shape-giving device 100, but a plate-shaped element is sufficient to exert pressure on the fabric blank V.

The use of an upper part 130 likewise is possible in the first embodiment of the manufacturing method of the housing 10. The explanations made above in this connection apply analogously.

When bracing lower and upper part 110, 130 against each other, pressure at the same time is exerted on the interposed flange portions 40a', 40b', 40c', 40d', 40a", 40b", 40c", 40d", 40a''', 40b''', 40c''', 40d''', 40b'''' of the fabric blanks I, II, III, V.

Like already in the first embodiment of the manufacturing method of the housing 10, a defined temperature and a defined pressure is applied to the fabric blanks I, II, III, V and the gas bag for a certain period, while they are arranged as shown in FIG. 12. As regards the application of temperature and/or pressure reference is made to the explanations concerning the first embodiment of the manufacturing method.

Subsequently, the upper part 130 is removed from the lower part 110 by means of the pressure stamp 120 and the housing 10 is taken out of the lower part 110 (FIG. 13). As a result, the housing 10 comprises a base portion 20, four lateral portions 30a, 30b, 30c, 30d projecting substantially vertically from the base portion 20 with corresponding flange portions 40a, 40b, 40c, 40d, a ceiling portion 50 opposite the base portion 20, and a gas bag package 200 which is enclosed by said portions (except for the flange portions). The second embodiment of the manufacturing method leads to the fact that the gas bag package 200 arranged in the housing almost completely maintains its compressed condition after removing the pressure stamp 120.

In an alternative of the second embodiment of the manufacturing method the formation of a ceiling portion 50 is omitted.

The invention claimed is:

1. A housing for an airbag module for accommodating a folded gas bag, comprising a base portion and at least one lateral portion projecting from the base portion, wherein at least one of the portions comprises at least two layers of a flexible material, wherein the at least two layers are superimposed and are cohesively connected with each other, wherein between the at least two layers a connecting material is provided to connect the at least two layers, wherein the connecting material has a two-dimensional extension over the entire surface of the at least two layers, between the at least two layers, and wherein the connecting material is activatable by application of pressure and/or temperature, so that the connecting material connects the at least two layers, wherein the flexible material comprises a fabric.

2. The housing according to claim 1, wherein the connecting material, before it connects the at least two layers with each other, is formed as layer to be arranged separately between the at least two layers or as coating of at least one of the at least two layers.

3. The housing according to claim 1, wherein the connecting material has a lower melting point than the flexible material.

4. The housing according to claim 1, wherein the connecting material comprises a thermoplastic material.

5. The housing according to claim 4, wherein the connecting material comprises a thermoplastic polyurethane.

6. The housing according to claim 1, wherein each portion comprises at least two layers.

7. A method for manufacturing the housing of claim 1, comprising the following steps:
   arranging the at least two layers one above the other such that the at least two layers are superimposed,
   cohesively connecting the at least two layers with each other by placing the connecting material between the at least two layers, and
   applying pressure and/or temperature to activate the connecting material.

8. The method according to claim 7, before cohesively connecting the at least two layers, the same are arranged with respect to a shape-giving device.

9. The method according to claim 8, wherein before cohesively connecting the at least two layers together with a folded gas bag, the same are arranged in the shape-giving device.

10. The method according to claim 8, wherein before cohesively connecting the at least two layers, the same are releasably attached to the shape-giving device.

11. The method according to claim 7, wherein before cohesively connecting the at least two layers, the connecting material in the form of a foil is positioned between the at least two layers.

* * * * *